United States Patent [19]

Dietrich

[11] Patent Number: 5,669,455

[45] Date of Patent: Sep. 23, 1997

[54] BI-ROTATIONAL COUPLING SYSTEM

[76] Inventor: Rainer Dietrich, Wernerusstr. 35, D-29227 Celle, Germany

[21] Appl. No.: 594,774

[22] Filed: Jan. 31, 1996

[51] Int. Cl.$^6$ ..................................................... F16D 1/10
[52] U.S. Cl. ........................... 175/57; 175/320; 464/182
[58] Field of Search ........................ 464/182, 157, 464/149; 403/383; 175/320, 323, 57, 107; 166/242.6

[56] References Cited

U.S. PATENT DOCUMENTS

| | | |
|---|---|---|
| 1,006,661 | 10/1911 | Knapp . |
| 2,141,880 | 12/1938 | Satre . |
| 2,737,119 | 3/1956 | Hill . |
| 3,485,062 | 12/1969 | Blake .................... 464/149 X |
| 4,391,547 | 7/1983 | Jackson, Jr. et al. ............ 464/157 X |
| 4,462,472 | 7/1984 | Beimgraben . |
| 4,485,880 | 12/1984 | Makohl . |
| 5,284,455 | 2/1994 | Kuribayashi ................ 464/182 X |
| 5,411,383 | 5/1995 | Parnell et al. . |

*Primary Examiner*—William P. Neuder
*Attorney, Agent, or Firm*—Keeling Law Firm

[57] ABSTRACT

A bi-rotational coupling system that provides separate transmission components for the weight forces and the torque forces and allows rotation in either direction without decoupling. The weight support component provides vertical connection of rotating members. The torque transfer component, that is functionally independent from the weight support component, provides for transmission of the torque forces between the rotating members. A stabilizer that has a plurality of protrusions extending therefrom prevents contact between the coupler and rotating members and the surrounding tubing. Functionally applying this apparatus affords a method of providing bi-rotational coupling and of reducing component wear.

12 Claims, 1 Drawing Sheet

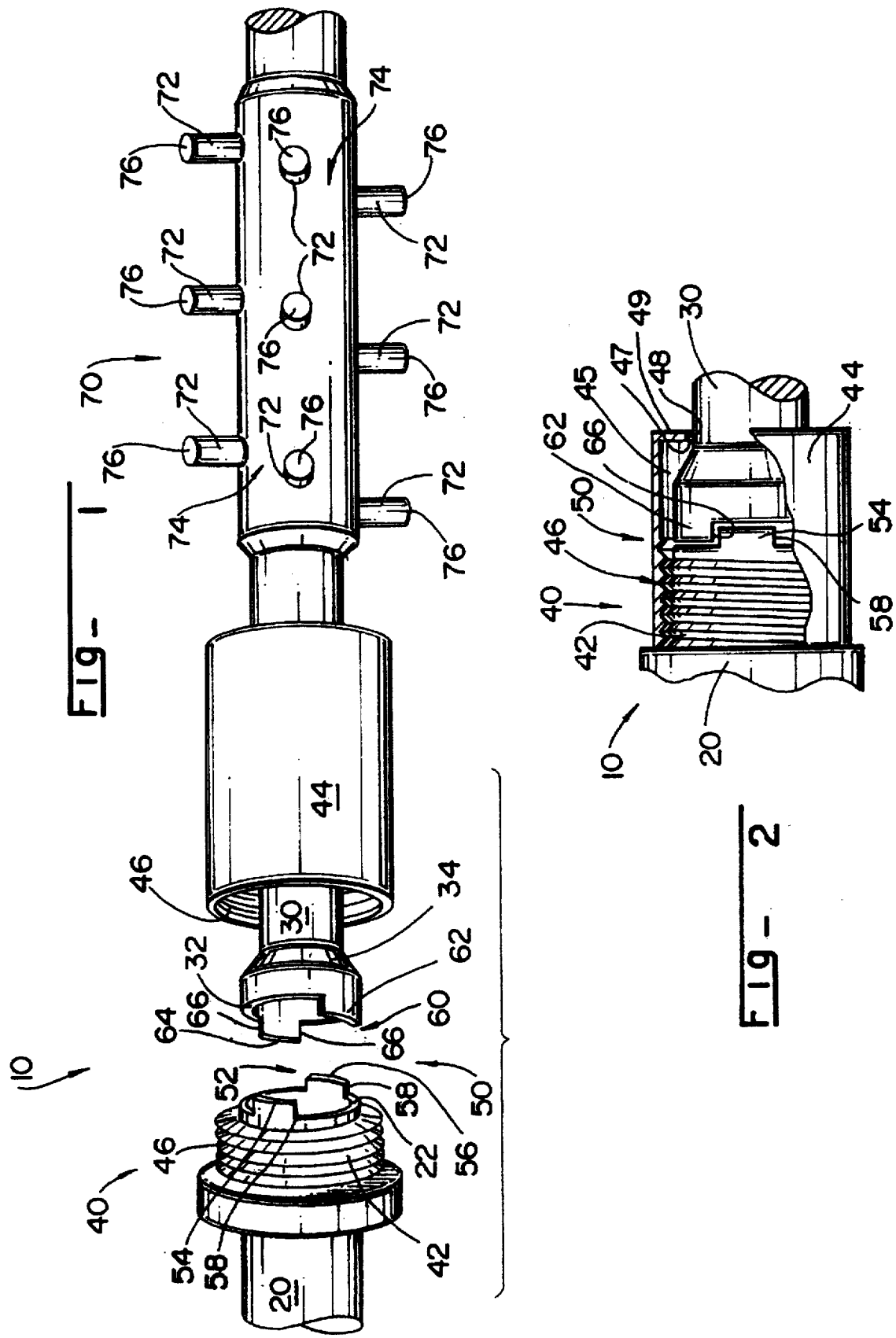

1

BI-ROTATIONAL COUPLING SYSTEM

BACKGROUND OF THE INVENTION

1. Field of Invention

This invention relates to a coupling system and method. More specifically, it is directed to a coupling system that permits rotation of the coupled members in both directions without permitting their decoupling.

Remote subterranean location operations often require the use of rotating equipment that rotates in both directions. For example, certain pumps positioned in the bottom of the hole can alternatively move fluid downward or upward and, thus, require bi-rotational coupling. A rod transmits top surface motor power to the bottom hole pump. Any such bi-rotational coupler for this application must ensure that the parts will remain joined to prevent down time and loss of equipment.

Also, due to the weight of the drilling string, the forces on the coupling can often be excessive resulting in damage to the coupler and other components as well as loss in production time. Consequently, isolating the weight forces from the torque forces reduces the total force on the coupler and, thereby, extends the life of the coupler.

In addition, when rotating in the subterranean environment, equipment damage often results from contact with the surrounding subterranean wall. As discussed, damage to the equipment increases the cost of production in many ways including equipment replacement.

2. Related Art

Downhole couplers have long been known to the prior art. Illustrative of such coupling systems are U.S. Pat. No. 1,006,661, U.S. Pat. No. 2,141,880, U.S. Pat. No. 2,737,119, U.S. Pat. No. 4,462,472, U.S. Pat. No. 4,485,880, and U.S. Pat. No. 5,411,383.

Though the above mentioned devices may be helpful in achieving their intended purposes, they can be improved to provide greater reliability and protection of the coupler system and, thereby, provide a more efficient and less costly coupling system.

SUMMARY OF THE INVENTION

Accordingly, the objectives of this invention are to provide, inter alia, a bi-rotational coupling system that:

couples adjacent rotating parts;

reduces damage to rotating parts operating in a subterranean environment;

reduces the maintenance costs of subterranean operations;

permits rotation of the parts in both directions without decoupling;

provides support for the weight of the components below the coupler;

isolates the weight forces from the rotational, torque forces and supports the forces with independently operating members;

prevents contact of the rotating members with the subterranean wall; and permits the free flow of fluid about the stabilizer.

Other objects of the invention will become apparent from time to time throughout the specification and claims as hereinafter related.

To achieve such improvements, my invention is a bi-rotational coupling system that isolates the weight forces of the rotating equipment from the torque forces of the equipment. A weight support component provides vertical connection of a first rotating member and a second rotating member. A torque support component provides for the transfer of torque forces between the first rotating member and the second rotating member. The two components are functionally independent. To provide for extended coupler life, the weight support component is constructed to transfer substantially no torque forces. Likewise, the torque support component is constructed to transfer substantially no weight forces. The coupler allows for rotation of the rotating members in either direction without decoupling. A method of providing bi-rotational coupling is to functionally apply the apparatus described above.

BRIEF DESCRIPTION OF THE DRAWING

The manner in which these objectives and other desirable characteristics can be obtained is explained in the following description and attached drawings in which:

FIG. 1 is an isometric view of the bi-rotational coupling system.

FIG. 2 is a partial cross sectional isometric view of the bi-rotational coupling system.

DETAILED DESCRIPTION OF THE INVENTION

The preferred embodiment of my invention is illustrated in FIGS. 1 and 2 and the bi-rotational coupling system is depicted as 10.

Generally, the coupling system 10 is made up of a first rotating member 20, a second rotating member 30, a weight support means 40, and a torque transfer means 50. The weight support means 40 and the torque transfer means 50 are functionally independent from each other so that the weight support means 40 transfers substantially no torque forces and the torque support means 50 transfers substantially no weight forces. A stabilizer means 70 positioned on either of the rotating members, 20 or 30, prevents contact between the rotating members, 20 or 30, and a tubing, or other downhole environment (hereinafter "tubing"), when the bi-rotational coupling system 10 is within a tubing.

The weight support means 40 provides vertical connection of the first rotating member 20 and the second rotating member 30. Generally, the weight support means 30 comprises a fixed connector 42 and a rotating connector 44. The fixed connector 42 is fixedly attached to the first rotating member 20 and is preferably integral therewith. The rotating connector 44 is rotatably connected to the second rotating member 30.

Typically, the rotating connector 44 has a cylindrical shape and defines a substantially cylindrical rotating connector cavity 45 therein. The rotating connector rear wall 49 has a circular rotating connector orifice 47 therethrough. The diameter of the rotating connector orifice 47 is smaller than the diameter of the rotating connector cavity 45. A second rotating member shoulder 34 is fixedly attached to the second rotating member 30 between the rotating connector rear wall 49 and the fixed connector 42. The outer diameter of the shoulder 34 is greater than the diameter of the rotating connector orifice 47. In this way, the rotating connector 44 is maintained on the second rotating member 30.

The rotating connector orifice 47 defines a rotating connector bearing surface 48. This bearing surface 48 provides for smooth, low friction rotation of the rotating connector 44 on the second rotating member 30.

The fixed connector 42 and the rotating connector 44 are constructed for cooperating attachment. Preferably, the attachment is accomplished by a cooperating connecting means 46 such as mating threads. The first rotating member 20 and the second rotating member 30 are substantially axially aligned when connected. In this way, the rotating connector 44 and the second rotating member 30 are constructed such that the friction between said rotating connector 44 and said second rotating member 30 is sufficiently low to substantially prevent transmission of torque forces therebetween. Because the rotating connector 44 rotates on the second rotating member 30 and transfers no torque therebetween, the weight support means 40 transfers no torque forces.

Consequently, the torque transfer means 50 must transfer all of the torque between the first rotating member 20 and the second rotating member 30. The torque transfer means 50 generally comprises detents, 52 and 60, on the rotating members, 20 and 30, that cooperate to transfer the torque therebetween. At least one first rotating member detent 52 extends in an axial direction from the first rotating member end 22. Likewise, at least one second rotating member detent 60 extends in an axial direction from the second rotating member end 32. The first rotating member detent 52 and the second rotating member detent 60 are constructed for cooperating abutment and for the transfer of torque therebetween. In the preferred embodiment, as shown in the figures, the torque transfer means 50 includes two first rotating member detents 52 and two second rotating member detents 60.

The first rotating member detent 52 comprises an extended member 54 that has a top face 56 and abutment ends 58. Similarly, the second rotating member detent 60 comprises an extended member 62 that has a top face 64 and abutment ends 66. The first extended member abutment ends 58 and the second extended member abutment ends 66 abut one another when in use. It is through the abutment ends, 58 and 66, that the torque is transferred. When the first rotating member 20 turns, the abutment ends 58 of the first extended member 54 engage the abutment ends 66 of the second extended member 62. The engagement causes a transfer of torque between the rotating members, 20 and 30. Because each of the extended members, 54 and 62, have two abutment ends, 58 and 66, the torque transfer means 50 can transmit torque in either rotational direction.

As mentioned, the stabilizer means 70 prevents contact between the rotating members, 20 and 30, and a surrounding tubing. Although the stabilizer means 70 may fit on either of the rotating members, 20 or 30, it is shown in the figures attached to the second rotating member 30. Positioned substantially equidistant about the perimeter of the rotating member, 20 or 30, a plurality of stabilizer protrusions 72 extend substantially radially therefrom. The apogee ends 76 of the stabilizer protrusions 72 extend beyond the outermost diameters of the other parts of the coupler system 10. Thus, when the coupler system 10 moves within a tubing, the stabilizer protrusion apogee ends 76 contact the tubing and prevent contact of the other components. Therefore, the stabilizer protrusions 72 must be substantially rigid to withstand the radial forces on the coupling system 10 and other associated rotating parts, but may be relatively resilient to soften the impact forces and, thereby, extend the life of the components.

To facilitate fluid flow about the stabilizer means 70, adjacent stabilizer protrusions 72 are axially offset to produce a progressive spiral design about the rotating member, 20 or 30. Additionally, the stabilizer protrusions 72 are aligned in axial groups and define axial passageways 74 therebetween. Preferably, adjacent stabilizer protrusions 72 are offset 90 degrees and, thus, form four axial groups and four axial passageways 74. Therefore, as fluid flows about the stabilizer means 70, the stabilizer protrusions 72 induce rotational flow allowing improved flow about the stabilizer protrusions 72 and provide axial passageways 74 for the bulk of the flow.

Accordingly, a method for reducing the wear of a tubing and a rotating member, 20 or 30, disposed therein comprises functionally applying the above described coupling system 10. Likewise, applying this system provides a method of coupling rotating bodies, 20 and 30, that facilitates their rotation in both directions without decoupling.

I claim:

1. A bi-rotational coupling system comprising:
   a first rotating member;
   a second rotating member;
   weight support means for providing vertical connection of said first rotating member and said second rotating member;
   torque support means for transferring torque between said first rotating member and said second rotating member;
   said weight support means functionally independent from said torque support means so that said weight support means transfers substantially no torque forces and said torque support means transfers substantially no weight forces; and
   said first rotating member and said second rotating member capable of rotating either direction without decoupling.

2. A bi-rotational coupling system as claimed in claim 1 wherein said weight support means comprises:
   a fixed connector fixedly attached to said first rotating member;
   a rotating connector rotatably connected to said second rotating member; and
   said fixed connector and said rotating connector constructed for cooperating attachment.

3. A bi-rotational coupling system as claimed in claim 2 wherein said fixed connector is integrally connected to said first rotating member.

4. A bi-rotational coupling system as claimed in claim 2 wherein said fixed connector and said rotating connector are attached by cooperating connecting means.

5. A bi-rotational coupling system as claimed in claim 2 wherein said rotating connector and said second rotating member are constructed such that the friction between said rotating connector and said second rotating member is sufficiently low to substantially prevent transmission of torque forces therebetween.

6. A bi-rotational coupling system as claimed in claim 1 wherein said torque transfer means comprises:
   at least one first rotating member detent extending in an axial direction from an end of said first rotating member;
   at least one second rotating member detent extending in an axial direction from an end of said second rotating member; and
   said at least one first rotating member detent and said at least one rotating member detent constructed for cooperating abutment and transfer of torque therebetween.

7. A bi-rotational coupling system as claimed in claim 6 wherein:
   said at least one first rotating member detent comprises a first extended member having a top face and abutment ends;

said at least one second rotating member detent comprises a second extended member having a top face and abutment ends; and said first extended member abutment ends constructed for mating abutment with said second extended member abutment ends.

8. A bi-rotational coupling system as claimed in claim 6 wherein said torque transfer means having two first rotating member detents and two second rotating member detents.

9. A bi-rotational coupling system as claimed in claim 1 further comprising stabilizer means for preventing contact between said first rotating member and a tubing and for preventing contact between said second rotating member and said tubing when said bi-rotational coupling system is within said tubing.

10. A bi-rotational coupling system as claimed in claim 9 wherein said stabilizer means comprises:

a plurality of stabilizer protrusions;

said plurality of stabilizer protrusions extending substantially radially from said second rotating member;

said plurality of stabilizer protrusions disposed substantially equidistant about the circumference of said second rotating member;

said plurality of stabilizer protrusions positioned on said second rotating member with adjacent stabilizer protrusions axially offset to produce a progressive spiral design about said second rotating member; and said plurality of stabilizer protrusions defining axial passageways wherein none of said plurality of stabilizer protrusions impede axial flow between said plurality of stabilizer protrusions.

11. A method of reducing wear of a tubing and a rotating member disposed within said tubing comprising functionally applying the apparatus as claimed in claim 9.

12. A method of coupling rotating bodies that facilitates their rotation in both directions without decoupling comprising functionally applying the bi-directional coupling system according to claim 1.

* * * * *